(12) United States Patent
Dunn et al.

(10) Patent No.: US 9,225,596 B2
(45) Date of Patent: Dec. 29, 2015

(54) UNDIFFERENTIATED SERVICE DOMAINS

(71) Applicant: Citrix Systems, Inc., Fort Lauderdale, FL (US)

(72) Inventors: Andrew Dunn, Cambridge (GB); James Bulpin, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 415 days.

(21) Appl. No.: 13/886,024

(22) Filed: May 2, 2013

(65) Prior Publication Data

US 2014/0330948 A1 Nov. 6, 2014

(51) Int. Cl.
G06F 15/177 (2006.01)
H04L 12/24 (2006.01)
G06F 9/455 (2006.01)
G06F 9/50 (2006.01)

(52) U.S. Cl.
CPC ........ *H04L 41/0813* (2013.01); *G06F 9/45558* (2013.01); *G06F 9/5077* (2013.01); *G06F 2009/45575* (2013.01); *G06F 2209/5011* (2013.01)

(58) Field of Classification Search
USPC .......................................... 709/220, 221, 222
See application file for complete search history.

(56) References Cited

U.S. PATENT DOCUMENTS 7,143,279 B2 * 11/2006 Goud et al. ........................ 713/2
7,827,152 B1    11/2010 Gangasharan et al.
8,671,072 B1 *  3/2014 Shah et al. ...................... 707/610
2007/0266383 A1* 11/2007 White .............................. 718/1
2012/0167122 A1   6/2012 Koskimies

OTHER PUBLICATIONS

XenClient, http://www.citrix.com/products/xenclient/overview.html (last retrieved Aug. 15, 2013).
Qubes OS Project, http://www.qubes-os.org/trac (last retrieved Aug. 15, 2013).
Mirage OS, http://xenproject.org/developers/teams/mirage-os.html (last retrieved Aug. 15, 2013).
Oct. 9, 2014—(WO) International Search Report—App PCT/US2014/035775.

(Continued)

*Primary Examiner* — Liangche A Wang
(74) *Attorney, Agent, or Firm* — Banner & Witcoff, Ltd.

(57) ABSTRACT

Guest domains (virtual machines) may execute at a virtualization server. During execution, the guest domains may request various services to facilitate their operation. The virtualization server may disaggregate the services requested by the guest domains among various service domains. A service domain may be configured to provide one the services. The virtualization server may also maintain a pool of partially initialized service domains. When a guest domain requests a particular service, one of the partially initialized service domains may be selected from the pool, and the partially initialized service domain may complete initialization to become an initialized service domain. The initialized service domain may thus be configured to provide the service requested by a guest domain. The virtualization server may periodically replenish the pool of partially initialized service domains to ensure that a partially initialized service domain is available upon demand from one of the guest domains.

18 Claims, 9 Drawing Sheets

(56) References Cited

OTHER PUBLICATIONS

Lars Kurth, "Virtualization in the Cloud: Featuring Xen and XCP," The Eleventh Annual Southern California Linux Expo (SCALE11x), Feb. 24, 2013, retrieved on Aug. 8, 2014 from http://www.socallinuxexpo.org/scale11x/presentations/virtualization-xen-and-xcp.html.

Patrick Colp et al. "Breaking Up is Hard to Do," Operating Systems Principles, ACM, 2 Penn Plaza Suite 701, NY, NY 10121-0701, Oct. 23, 2011, pp. 189-202.

Barham P. et al. "Xen and the Art of Virtualization," ACM SOSP. Proceedings of the ACM Symposium on Operating Systems Principles, ACM, US, vol. 37, No. 5, Oct. 19, 2003, pp. 164-177.

Krsul, I. et al. "VMPlants: Providing and Managing Virtual Machine Execution Environments for Grid Computing," Supercomputing, 2004, Proceedings of the ACM/IEEE SC2004 Conference Pittsburgh, PA, Nov. 6-12, 2004, pp. 7-7.

Dave Scott, "The Citrix Blog Log in Blogs Search Communities Products Team Blogs Authors," The Citrix Blog, May 6, 2011, retrieved from Internet on Aug. 8, 2014, http://blogs.citrix.com/2011/05/06/xenserver-domain-0-32-or-64-bit/.

Michael Vrable et al., "Scalability, Fidelity, and Containment in the Potemkin Virtual Honeyfarm," ACM SIGOPS Operating Systems Review, Oct. 20, 2005, pp. 148-162, retrieved from Internet on Aug. 7, 2014, http://portal.acm.org/citation.cfm?id=1095825.

* cited by examiner

UNDIFFERENTIATED SERVICE DOMAINS

FIELD OF THE INVENTION

Aspects described herein generally relate to server virtualization. More specifically, various aspects provide approaches to server virtualization in which services are disaggregated among multiple service domains.

BACKGROUND OF THE INVENTION

Virtualization is an increasing trend in the field of information technology to enable new topologies for data center automation, cloud-class infrastructure, software-as-a-service, and the like. Virtualization refers to a method of abstracting physical aspects of the physical infrastructure from the particular environments the infrastructure is charged with hosting, e.g., applications, desktops, servers, storage, networks, and other types of computing resources.

One example of virtualization is the abstraction of server-class operating systems from the hardware on which those operating systems run through the use of an intermediate software layer, e.g., a middleware layer. This type of virtualization may be referred to as server virtualization, in which server-class operating systems run as instances of virtual machines. Server virtualization enables server operating systems running as instances of virtual machines ("virtual servers") to be isolated from the hardware of the physical server ("host machine").

A host machine may employ a hypervisor to manage the multiple virtual servers operating at the host machine. The hypervisor may create instances of the virtual servers and manage their operation. As an example, the hypervisor may be responsible for memory management and processor scheduling. The hypervisor may also be responsible for creating the virtual machine that has direct access to the hardware of the host machine. A virtual machine having direct access to the physical hardware of the host machine may be referred to as a privileged virtual machine. Virtual machines that do not have direct access to the physical hardware of the host machine may be referred to as unprivileged virtual machines. Unprivileged virtual machines may obtain indirect access to the hardware of the host machine via the privileged virtual machine.

In conventional practice, services available to the unprivileged virtual machines may be aggregated at the privileged virtual machine such that the privileged virtual machine may provide all of the services utilized by the unprivileged virtual machines. As the demand for services increases, however, the privileged virtual machine may become overloaded resulting in diminished performance and a reduced ability to effectively provide those services. Attempts to improve the performance of the privileged virtual machine by adding additional processing or memory resources may be unsuccessful due to diminishing returns. As a result, the scalability of conventional virtualization implementations may be limited. Therefore, a need exists for an approach to server virtualization that addresses the issues identified above.

BRIEF SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed toward approaches for providing server virtualization.

Multiple guest domains (virtual machines) may execute at a virtualization server. During execution, the guest domains may indicate a need for various services to facilitate their operation. The virtualization server may disaggregate the various services utilized by the guest domains among various service domains. A service domain may be configured to provide one of the services. In order to minimize the time required to boot and configure a service domain, the virtualization server may maintain a pool of partially initialized service domains. When a guest domain needs a particular service, one of the partially initialized service domains may be selected from the pool, and the partially initialized service domain may complete initialization to become an initialized service domain. Additionally, the initialized service domain may be configured to provide the service to the guest domain. The virtualization server may periodically replenish the pool of partially initialized service domains to ensure that a partially initialized service domain is available upon demand from one of the guest domains.

A first aspect described herein provides a method for providing server virtualization. A set of partially initialized service domains may be generated, and a request for a service may be received. One of the partially initialized service domains may be selected in response to receipt of the request for the service. Initialization of the partially initialized service domain may be completed in order obtain an initialized service domain. The service domain may be configured to provide the service requested.

A second aspect described herein provides an apparatus for providing services in a virtualized environment. The apparatus may include a set of partially initialized service domains. A management domain may select and provide configuration information to one of the partially initialized service domains. A hypervisor may be configured to schedule execution of the partially initialized service domain in order to complete initialization based on the configuration information, which may transform the partially initialized service domain into an initialized service domain. The initialized service domain may be configured to provide the service to a guest domain.

Some aspects described herein provide a queue of references respectively corresponding to the set of partially initialized service domains. References corresponding to partially initialized service domains selected to become initialized service domains may be removed from the queue, and references corresponding to new partially initialized service domains may be added to the queue.

Additional aspects described herein provide that a partially initialized service domain may be obtained by pausing a boot sequence of the partially initialized service domain. The partially initialized service domain may notify the hypervisor when the boot sequence reaches a trigger point, and the hypervisor may pause the boot sequence in response. In a paused state, the partially initialized service domain does not utilize a processing resource, whereas in an unpaused state, the partially initialized service domain does utilize a processing resource. The partially initialized service domain may access configuration information when unpaused and complete initialization based on the configuration information. The configuration information may be an initialization script or key-value pairings stored locally or remotely relative to the partially initialized service domain.

Further aspects described herein provide that the initialized service domain may be a software service domain, a hardware service domain, or a combined hardware and software service domain. The initialized service domain may provide a service to one or multiple guest domains. The initialized service domain may also manage access to one or multiple hardware devices.

Additional aspects will be appreciated with the benefit of the disclosures set forth in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein provide approaches to server virtualization. Guest domains (virtual machines) may execute at a virtualization server. During execution, the guest domains may have need of various services to facilitate their operation. The virtualization server may disaggregate the services utilized by the guest domains among various service domains. A service domain may be configured to provide one of the services. The virtualization server may also maintain a pool of partially initialized service domains. When a guest domain has need of a particular service, one of the partially initialized service domains may be selected from the pool, and the partially initialized service domain may be transformed into an initialized service domain by completing initialization. Completing initialization may include configuring the initialized service domain to provide a service utilized by a guest domain. The initialized service domain may thus be configured to provide the service to the guest domain. The virtualization server may periodically replenish the pool of partially initialized service domains to ensure that a partially initialized service domain is available upon demand from one of the guest domains.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
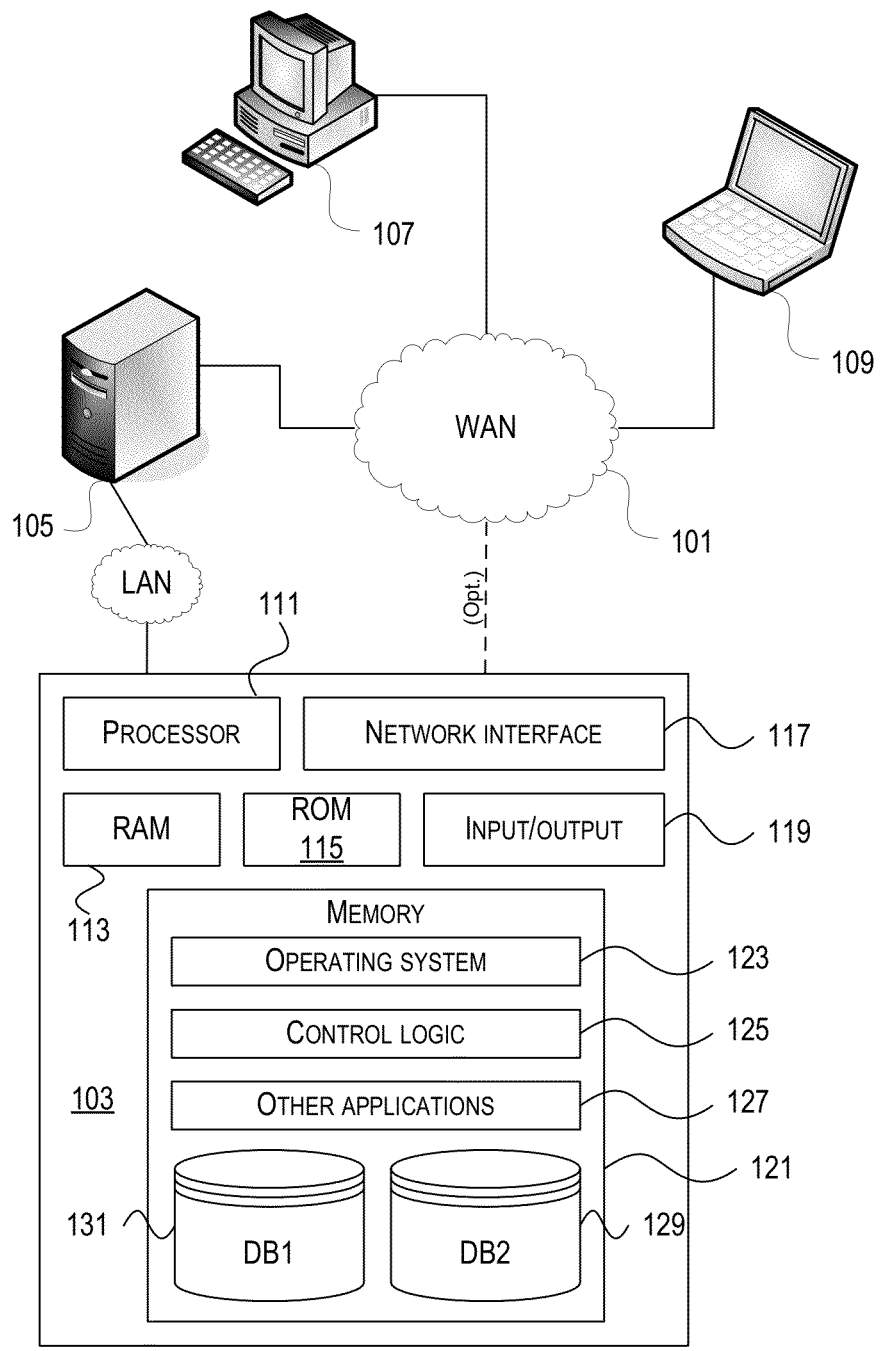
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the disclosure in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosures as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionality may be embodied in whole or in part in software, firmware and/or hardware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
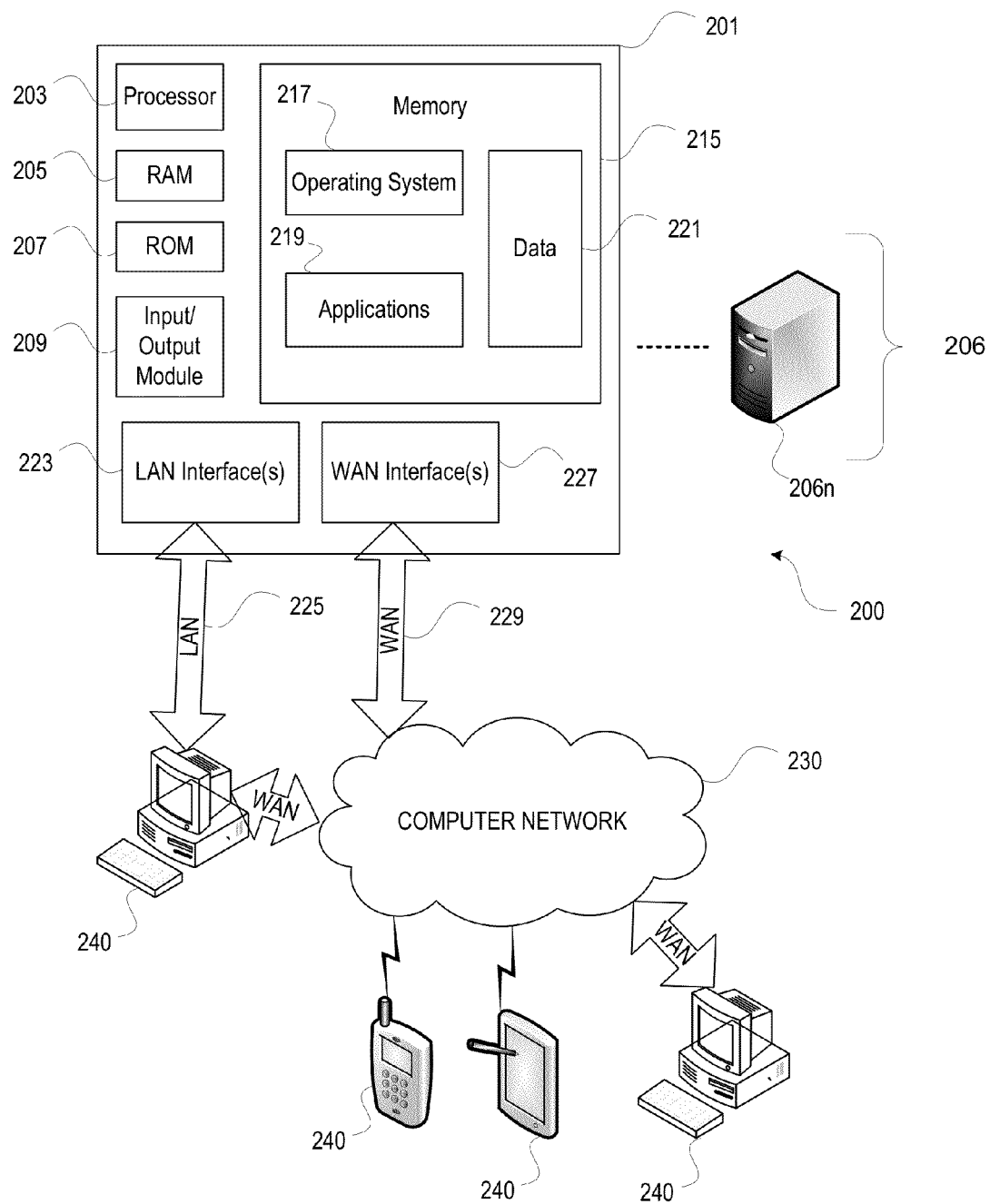
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206 in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 106a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
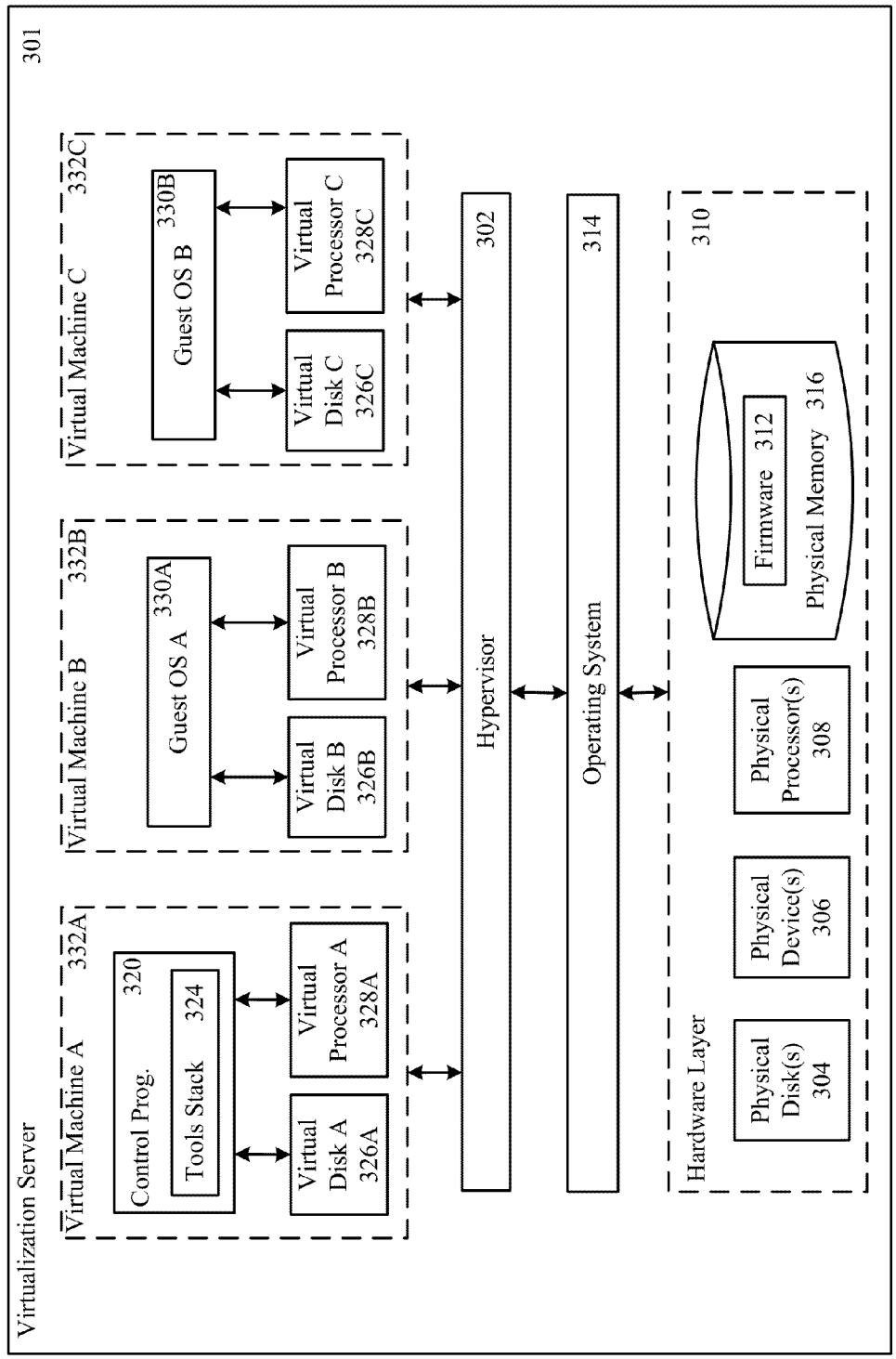
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development was previously overseen by the open source Xen.org community and is presently overseen by the Linux Foundation; HyperV, VirtualServer or virtual PC hypervisors provided by Microsoft; Kernel-based Virtual Machine (KVM) for the Linux kernel; or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more non-privileged virtual machines 332 and one or more privileged virtual machines 332. Non-privileged virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
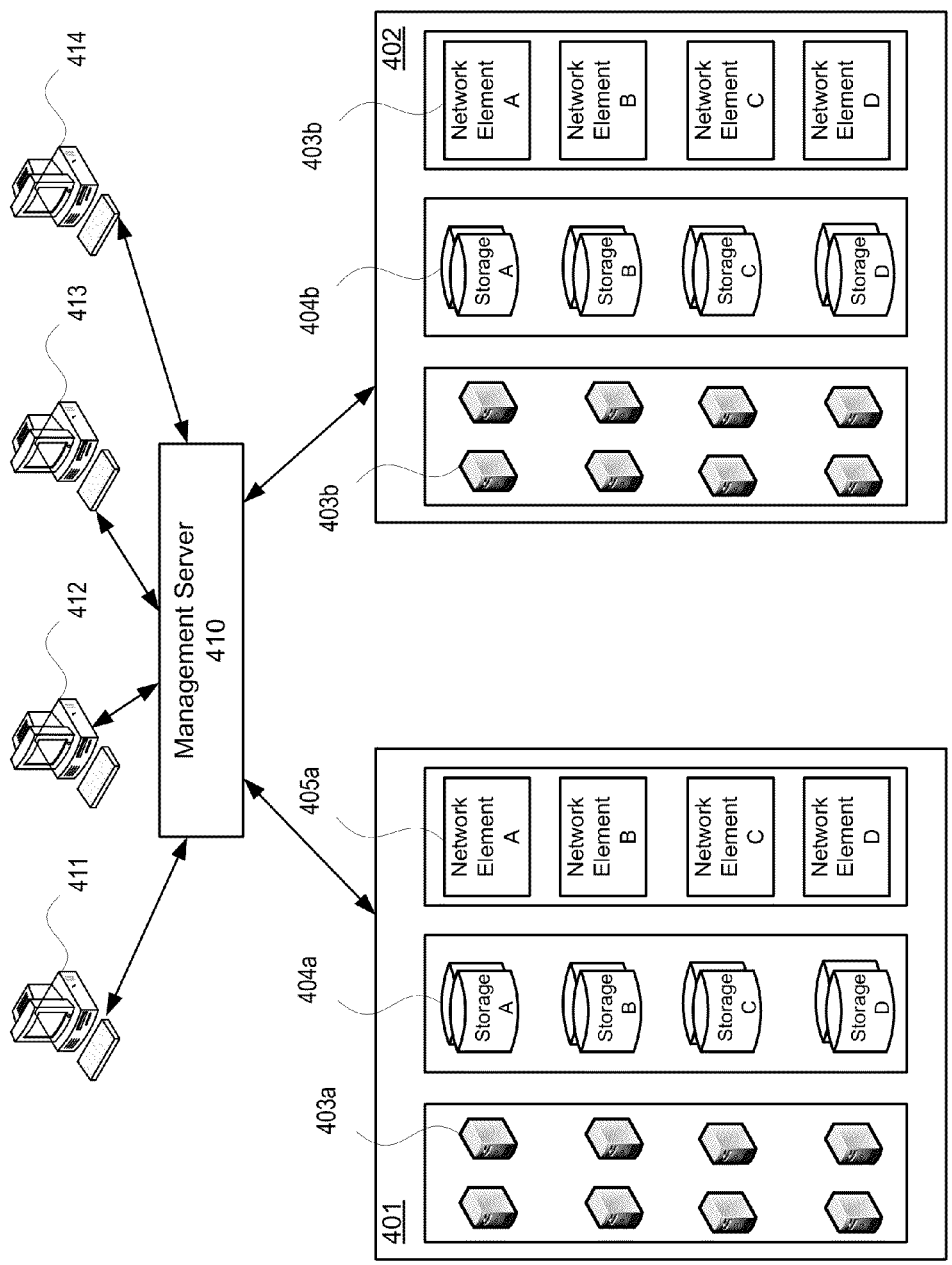
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Disaggregating Service Domains

Figure 5:
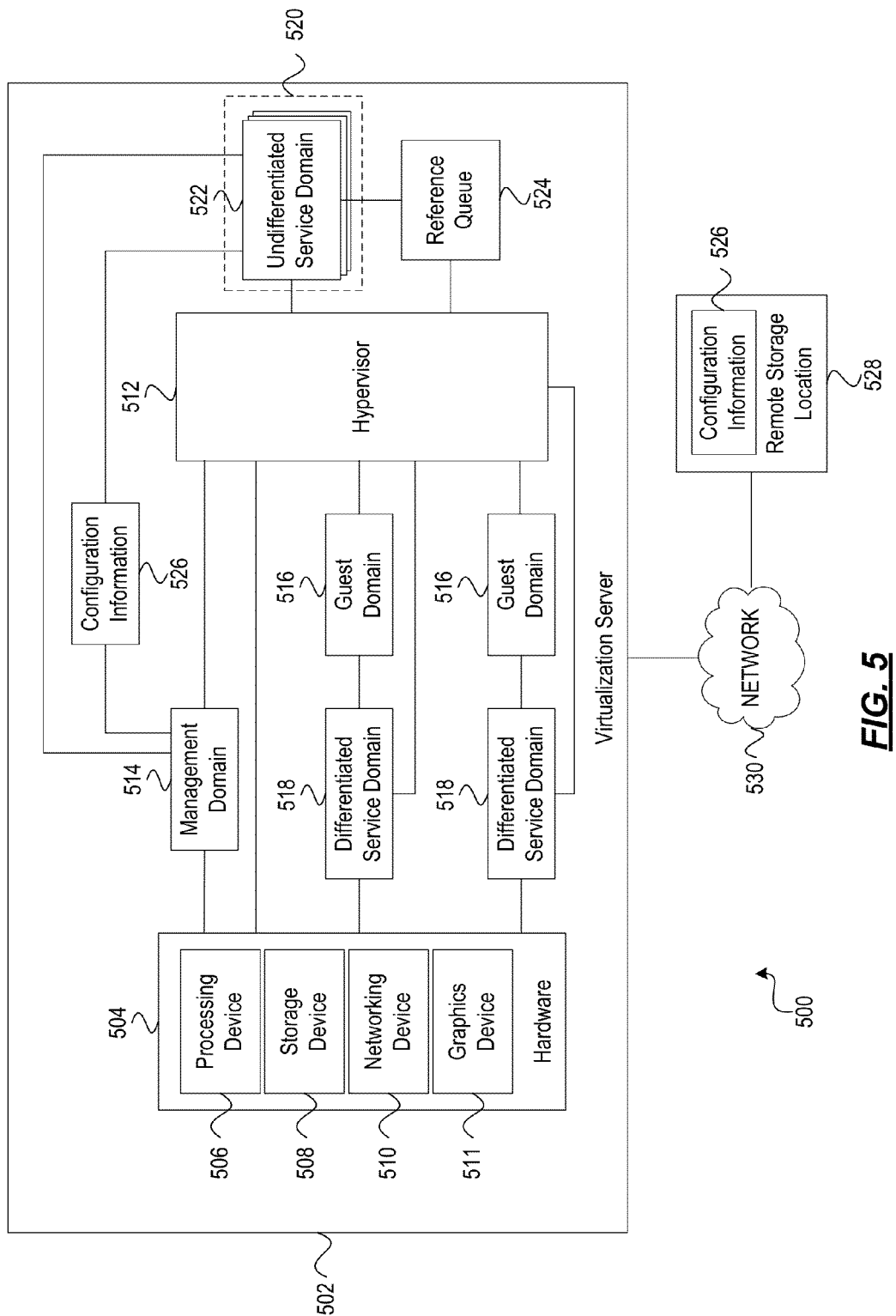
FIG. 5 depicts an illustrative server virtualization system having undifferentiated service domains.

Referring to FIG. 5, an illustrative example of a server virtualization system 500 having partially initialized service domains is shown. As described above, the server virtualization system 500 may include a virtualization server 502. The virtualization server 502 may be similar in many respects to the virtualization server 301 in FIG. 3. The virtualization server may include physical hardware 504 that includes one or more processing devices 506, one or more storage devices 508, one or more networking devices 510, and other types of physical hardware. The physical hardware 504 may be similar in many respects to the hardware layer 310 in FIG. 3; the processing devices 506 may be similar in many respects to the physical processors 308 in FIG. 3; the storage devices 508 may be similar in many respects to the physical disks 304, firmware 312, and/or physical memory 316 in FIG. 3; and the networking device 510 may be one type of physical device 306 discussed above with reference to FIG. 3. The physical hardware 504 may also include one or more graphics devices 511, e.g., a graphics processing unit.

The virtualization server 502 may also include a hypervisor 512 configured to execute at the virtualization server. The hypervisor 512 may be similar in many respects to the hypervisor 302 in FIG. 3. As noted above, the hypervisor 512 may have direct access to the physical hardware 504 of the virtualization server 502 as shown by way of example in FIG. 5. As also noted above, the hypervisor 512 may monitor and manage instances of various domains executing at the virtualization server 502. As used in this disclosure, the term "domain" may be used interchangeably with the term "virtual machine." Accordingly, reference to "domains" in FIG. 5 should also be understood as references to virtual machines, such as virtual machines 332A-C described above with reference to FIG. 3.

One of the domains may be a management domain 514 that may also have direct access to the physical hardware 504 of the virtualization server 502. In this regard, the management domain 514 may be a privileged domain and may be similar in many respects to the virtual machine 332A described above with reference to FIG. 3. Other domains executing at the virtualization server 502 may include guest domains 516. The guest domains 516 may be unprivileged domains as they may not have direct access to the physical hardware 504 of the virtualization server 502. The guest domains 516 in FIG. 5 may be similar in many respects to the virtual machines 332B-C described above with reference to FIG. 3. Guest domains may also be referred to as user domains.

As previously discussed, conventional approaches to virtualization may aggregate available services at one virtual machine having direct access to physical hardware. The approach described in this disclosure disaggregates available services into individual service domains 518 and 520 that are configured to provide a service to the guest domains 516. A service domain 518 may be a privileged domain having direct access to at least some of the physical hardware 504 at the virtualization server 502 and configured to provide a particular service to one or more guest domains 516. Alternatively, a service domain 518 may be an unprivileged domain providing a software service. Service domains 518 may be differentiated based on the particular services the services domains are configured to respectively provide. Moreover, a service domain 518 may have completed its initialization process, which may include configuration of the service domain to provide a particular service. In view of this, the following terminology is adopted for the present disclosure. A service domain that has completed its initialization process and has been configured to provide a service to a guest domain is referred to in this disclosure as either an initialized service domain or a differentiated service domain, terms that may be used interchangeably.

Service domains 518 may be created in an ad hoc fashion according to the needs of the guest domains 516. As discussed in further detail below, a guest domain 516 may have need of a particular service, and an individual service domain 518 may be created in order to provide the needed service. When a service domain 518 is no longer needed, the virtualization system 500 may leave the service domain running (e.g., if the virtualization system expects to need the service domain in the future) or the virtualization system may tear down the service domain (e.g., to reclaim the memory occupied by the service domain). It will be appreciated that the virtualization system 500 may be selectively configured to handle service domains 518 that are no longer needed.

Various types of services domains 518 may be selectively employed to provide various types of services to the guest domains 516. Service domains 518 may include, for example, software service domains and hardware service domains. A hardware service domain may have direct access to the physical hardware 504 of the virtualization server 502. The hardware service domain may include or otherwise have access to the device drivers used to interface with the hardware devices of the virtualization server 502. In this regard, hardware service domains may also be referred to as driver domains. A hardware service domain may thus enable a guest domain 516 to access the physical hardware 504 at the virtualization server 502.

Access to the various hardware devices of the virtualization server 502 may be disaggregated among various types of hardware service domains. Types of hardware service domains may include, for example, a processing service domain that provides access to the processing device 506; a storage service domain that provides access to the storage device 508, e.g., a hard disk; a network service domain that provides access to the networking device 510, e.g., a network interface card; a graphics service domain that provides access to the graphics device 511, e.g., a graphics processing unit (GPU); and other types of input/output hardware. It will be appreciated that additional or alternative types of hardware service domains may be selectively employed to provide access to additional or alternative types of hardware devices at the virtualization server.

In some example implementations, a hardware service domain may provide access to one and only one hardware device. In other example implementations, a hardware service domain may provide access to multiple hardware devices. Likewise, a hardware service domain may be paired with one and only one guest domain 516 in some example implementations, while in other example implementations, a hardware service domain may be paired with multiple guest domains. Stated differently, a hardware service domain may establish a one-to-one relationship or one-to-many relationship with the hardware devices and/or the guest domains 516 at the virtualization server 502. Accordingly, a hardware service domain may perform the multiplexing and demultiplexing of communications exchanged between the guest domains 516 and the hardware devices of the virtualization server 502.

As an example, consider a virtualization server having a total of four network interface cards. In one implementation, four network service domains may be created and respectively paired with one of the network interface cards in a one-to-one fashion—one network interface card per network service domain. In another implementation, two network service domains may be established and respectively paired with two of the network interface cards in a one-to-many fashion—two network interface cards per network service domain.

Now consider that a total of eight guest domains are operating at the virtualization server in this example. In the one-to-one implementation, each of the four services domain may provide one-fourth of the guest domains with access to the network interface cards—two guest domains per network service domain. In the one-to-many implementation, each of the two service domains may provide one-half of the guest domains with access to the network interface cards—four guest domains per network service domain.

In the implementations described above, the network service domain may be described as performing the function of a network switch by multiplexing and demultiplexing the network communications between the guest domains 516 and the networking devices 510. It will be appreciated that additional or alternative approaches may be selectively employed depending on the hardware devices available at the virtualization server. Additionally, the example approaches set forth above may be likewise employed for additional or alternative types of hardware devices.

A software service domain may perform a particular software function or set of functions for a guest domain 516. Various types of software service domains may be selectively employed depending on the needs of the guest domains 516. Types of software service domains may include software service domains that provide, for example, DNS services (Domain Name System), NFS services (Network File System), virus scanning services, authentication and authorization (login) services, logging services, and the like.

It will be appreciated that there may be some overlap in the functionality and operation of hardware service domains and software service domains. In particular, hardware service domains may perform software-like functions, and software service domains may access the physical hardware 504 when performing their functions. For example, a hardware service domain providing access to network attached storage could also provide a software emulated multipath driver, or a hardware service domain providing access to a local disk driver could also provide a storage clustering service in software.

It will also be appreciated that disaggregating services as described above provides various technical advantages. For example, disaggregating services among individual service domains enables the virtualization server 502 to isolate services from one another such that the services may execute in parallel at their respective service domains. Parallelization techniques may thus be employed to simultaneously respond to the needs of the guest domains 516 without requiring a significant increase in computing resources. Additionally, disaggregating services among individual service domains may reduce the dependency between the guest domains 516 that no longer need to share a single management domain.

Undifferentiated Service Domains

Still referring to FIG. 5, individual service domains 518 may be created to perform various tasks for the guest domains 516 as described above. It will be appreciated, however, that creating a new service domain 518 and starting a new service within that service domain comes with a certain amount of overhead, e.g., time, computing resources, and the like. Creating a new service domain may include, for example, initializing the operating system (e.g., Windows or Linux) in which the service runs and then initializing the service itself. Accordingly, a non-negligible wait time may be associated with creating a new service domain 518 for a guest domain 516. As described below, techniques may be employed to reduce the wait time associated with creating the new service domain 518 for the guest domain 516.

As noted above, creating a service domain 518 may include initializing the operating system and then configuring the service domain to provide the service. Although the configuring step may depend on the service provided, the initializing the operating system of the service domain may be the same regardless of the service provided. Accordingly, the virtualization server 502 may maintain a set 520 of partially initialized service domains 522 that may be subsequently configured based on the needs of the guest domains 516. As discussed in further detail below, partially initializing a service domain may involve pausing the boot sequence before the configuration step is performed. Stated differently, the partially initialized service domains are not configured to provide a particular service In view of this, the following terminology is adopted for the present disclosure. A service domain that has not yet completed its boot sequence and has not been configured to provide a particular service is referred to in this disclosure as either a partially initialized service domain or an undifferentiated service domain, terms that may be used interchangeably. It will be appreciated, however, that partially initialized service domains may be distinguishable from one another. For example, the partially initialized service domains may have completed various initialization steps that provide the undifferentiated services domains with some uniquely identifiable configuration settings. In some example implementations, the virtualization server may maintain multiple sets of partially initialized service domains that are distinguishable from one another, e.g., one set of partially initialized service domains configured for an operating system of one type (e.g., Windows) and another set of partially initialized service domains configured for an operating system of another type (e.g., Linux).

The set 520 of undifferentiated service domains may include one or more undifferentiated service domains and may be referred to as a pool of undifferentiated service domains. The virtualization server 502 may also maintain a reference queue 524 that includes references to the individual undifferentiated service domains 522 in the pool 520. When a guest domain 516 has need of a service, the management domain 514 queries the reference queue 524 for the reference to the next available undifferentiated service domain 522. The management domain 514 may select the next available undifferentiated service domain 522, and the undifferentiated service domain selected may complete initialization and configure itself to provide the service to the guest domain. The selected undifferentiated service domain 522 may be configured to provide the service based on configuration information 526. The configuration information 526 may be stored locally at the virtualization server 502 and/or at a remote storage location 528 accessible via a network 530.

As noted above, an undifferentiated service domain 522 is a partially initialized service domain that has not yet completed its initialization or been configured to provide a particular service, e.g., by pausing the boot sequence. As discussed further below, the initialization sequence of an undifferentiated service domain 522 may be paused before the step of configuring the service domain to provide a particular service. When a guest domain 516 has need of a service, the management domain 514 or the hypervisor 512 may select one of the undifferentiated service domains 522 from the pool 520 of undifferentiated service domains. The initialization sequence of the selected undifferentiated service domain 522 may be unpaused to complete the initialization sequence and to configure the service domain to provide the service to the guest domain 516. By completing the initialization process and configuring the undifferentiated service domain 522 to provide a particular service, the undifferentiated service domain is transformed into a differentiated (fully initialized) service domain 518. Steps for creating undifferentiated service domains 522 and differentiated service domains 518 will be discussed in further detail below.

As noted above, the hypervisor 512 may be responsible for processor scheduling, which includes scheduling execution of the boot sequence of a service domain. The hypervisor 512 may thus pause the boot sequence of the service domain by not scheduling the boot sequence for execution at the processing units of the virtualization server 502. Accordingly, in a paused state, an undifferentiated service domain 522 occupies a space in memory at the virtualization server 502 but is not utilizing any processing resources. In an unpaused state, an undifferentiated service domain 522 occupies a space in memory and is utilizing processing resources of the virtualization server 502, e.g., to complete the final step of configuring the undifferentiated service domain to provide the service to a guest domain. It will be appreciated that configuring a service domain to provide a service may include multiple steps. Steps for pausing and unpausing undifferentiated service domains will be discussed in further detail below.

The reference queue 524 may be a list of unique identifiers for the undifferentiated service domains 522. The unique identifier may be, for example, a universally unique identifier (UUID) and may map to a domain identifier, e.g., an integer, which in turn may refer to information at the hypervisor 512 that includes details about the undifferentiated service domain 522 including the location where the undifferentiated service domain is stored in memory. After an undifferentiated service domain 522 has been selected from the pool 520 and configured as a differentiated service domain 518, the management domain 514 may remove the reference from the reference queue 524 such that the next undifferentiated service domain is available for selection.

The configuration information 526 may determine the type of differentiated service domain 518 an undifferentiated service domain 520 becomes. When a guest domain 516 has need of a particular service, the management domain 514 may write the configuration information 526 to a shared storage location that is accessible to the undifferentiated service domains 522. The boot sequence of an undifferentiated service domain 522 may be configured to access that shared storage location when unpaused in order to retrieve the configuration information 526 used to complete the final configuration steps.

The configuration information 526 may be, for example, information that specifies how the undifferentiated service domain 522 should configure itself or information that specifies a set of steps the undifferentiated service domain should execute to complete initialization and configuration. In some implementations, for example, the configuration information may be metadata that includes a set of one or more key-value pairings indicating how an undifferentiated service domain 522 should configure itself. In this example implementation, the undifferentiated service domain 522 may be configured to selectively complete initialization and configuration based on the key-value pairings. Key-value pairings may include, for example the type of service domain, e.g., a service domain class (e.g., class=network, class=storage, class=login, etc.). An undifferentiated service domain 522 may be configured to selectively initiate a set of services or selectively associate with a set of hardware devices depending on the type of service domain class indicated in the metadata. The metadata may also include other types of key-value pairings such as, for example, a key-value pairing that specifies how many hardware devices and/or guest domains 516 the undifferentiated service domain should associate with (e.g., device_pairing=1, domain_pairing=1; device_pairing=1, domain_pairing=2; device_pairing=2, domain_pairing=4; etc.). In this way, the configuration information 526 may indicate whether a differentiated service domain 518 should establish a one-to-one or one-to-many relationship with the hardware devices and/or the guest domains 516. In this example implementation, the undifferentiated service domain 522 itself may include the instructions necessary to complete initialization and configuration.

In other implementations, an undifferentiated service domain may rely on instructions included in the configuration information 526 to complete initialization and configuration. In these other example implementations, the configuration information 526 may be one or more initialization scripts. The undifferentiated service domain 522 may thus execute the steps included in the initialization scripts in order to complete the final initialization and configuration step. It will be appreciated that the configuration information 526 may be one or more uniform resource identifiers (URIs) that point to the initialization scripts. Accordingly, the configuration information 526 may include a URI comprising a file path to an initialization script stored locally at the virtualization server 502 or comprising an uniform resource locator (URL) to an initialization script (or other configuration information 526) stored at a remote storage location 528. In some implementations, the virtualization server 502 may store the initialization scripts for all possible service classes an undifferentiated service domain 522 may become.

It will be appreciated that in further example implementations, the undifferentiated service domain 522 may be configured to utilize both metadata and initialization scripts to complete the final step of initialization and configuration in order to become a differentiated service domain. Moreover, notwithstanding the description of a differentiated service domain 518 as providing a particular service, it will be appreciated that the configuration information 526 may indicate one or more services to initiate for the differentiated service domains, e.g., additional services to facilitate and support the service provided by the differentiated service domain.

Figure 6:
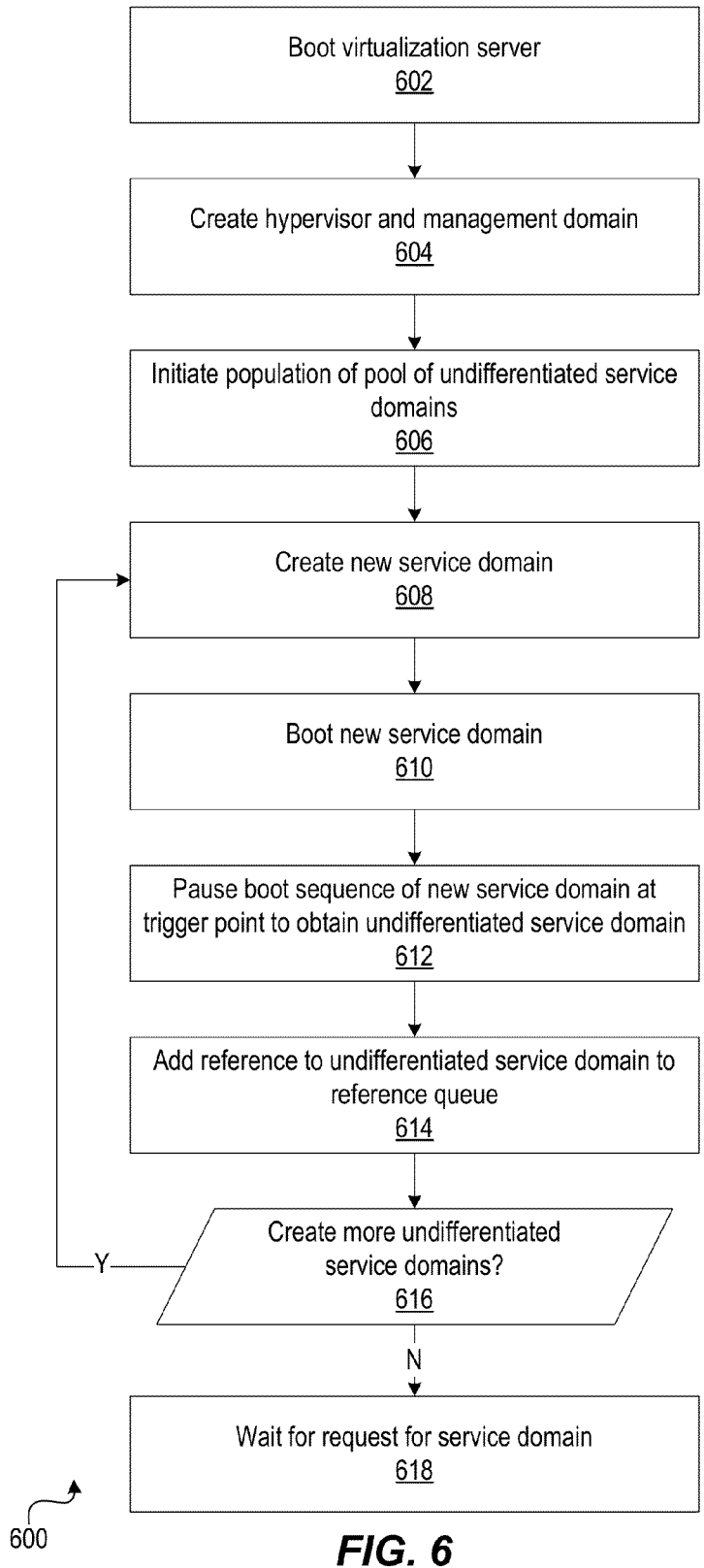
FIG. 6 depicts a flowchart of example method steps for initializing a pool of undifferentiated service domains.

Referring now to FIG. 6, a flowchart 600 of example method steps for initializing a pool of undifferentiated service domains is shown. First, the virtualization server may be booted up and initialized (block 602). The virtualization server may create the hypervisor and management domain during the initialization process (block 604). The management domain may then initiate population of the pool of undifferentiated service domains (block 606). The number of undifferentiated service domains initially created may depend on the resources available (e.g., the available memory) at the virtualization server. In some example implementations, the management domain may create an initial pool of ten undifferentiated service domains.

The management domain may create a new service domain (block 608) and initiate the boot sequence of the new service domain (block 610). Once created, the service domain occupies a space in the memory of the virtualization server and is utilizing processing resources to execute the boot sequence. Accordingly, the service domain is in an unpaused state at this stage. During the boot sequence, however, the new service domain goes into a paused state at a trigger point (block 612). As noted above, the new service domain is not utilizing the processing resources of the virtualization server in the paused state. The trigger point may be, for example, the point at which the boot steps common to all service domains have been completed, e.g., checking memory, storage space, and the like. Stated differently, the boot sequence for the new service domain may be paused at a trigger point after baseline hardware discovery and initialization of baseline services and before initialization of application-level services. In some example implementations, the trigger point may the point at which the boot sequence reaches the user-space initialization portion of the boot sequence (e.g., the rc.sysinit script or the init.d directory).

Having paused the boot sequence for the new service domain, the partially initialized service domain may be referred to as an undifferentiated service domain. The management domain may add a reference to the new undifferentiated service domain to the reference queue (614). The new undifferentiated service domain is thus available for selection and configuration as a differentiated service domain when a guest domain has need of a particular service. As noted above, the management domain may create multiple undifferentiated service domains to populate the pool. In some example implementations, the virtualization server may clone or copy an existing undifferentiated service domain to create a new undifferentiated service domain. If the management domain decides to create additional undifferentiated service domains (block 616:Y), then the management domain may repeat steps 608-614 to create additional undifferentiated service domains. If the management domain is finished creating undifferentiated service domains (block 618:N), then the management domain may wait to receive a service request (block 618), e.g., an indication that one of the guest domains has need of a particular service.

Figure 7:
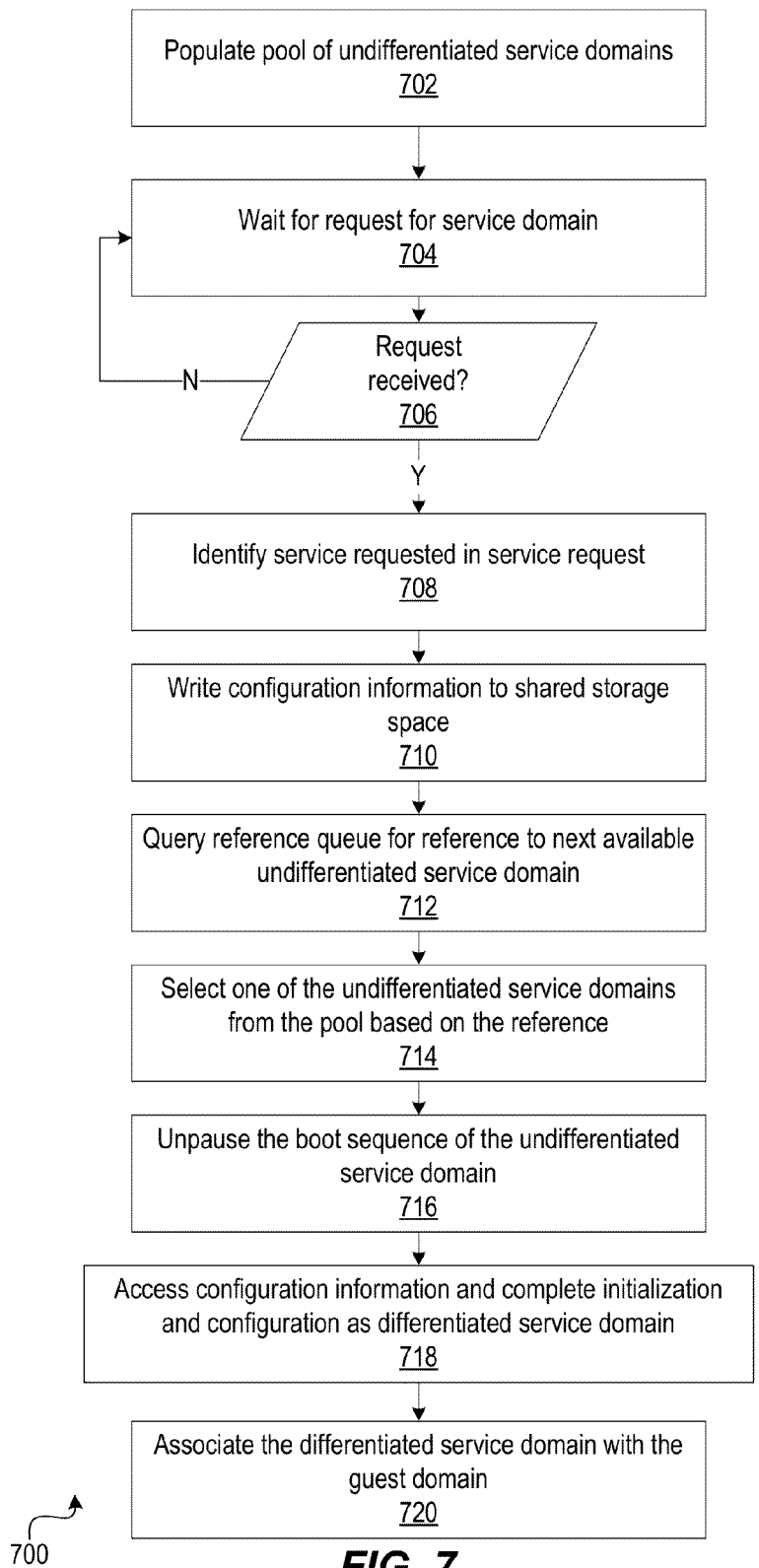
FIG. 7 depicts a flowchart of example method steps for responding to a need for a service at a guest domain.

FIG. 7 depicts a flowchart 700 of example method steps for responding to a need for a service a guest domain. The management domain may populate a pool of undifferentiated service domains (block 702) and wait to receive a service request (block 704), e.g., an indication that a guest domain has need of a particular service. In some examples, a management domain may receive an explicit request for a service from, e.g., another management domain operating at the virtualization server, the hypervisor, or the guest domain. In other example implementations, the request for a particular service may be implicit as described by way of example below. Domains executing at the virtualization server may communicate with each other via an inter-domain communication channel. As one example, the inter-domain communication channel may be an explicit channel (e.g., a TCP connection) over a virtualized network channel between the guest domain and the management domain. In this example, the service request may be an explicit request for a service. As another example, the inter-domain communication channel may be an implicit request for service cause by the configuration of the guest domain (e.g., the guest domain does not actively request a service, the service request is implied via the configuration of the guest domain). In this other example, a guest domain may be configured, e.g., to have access to the GPU, and the virtualization system may automatically determine that a hardware service domain is required to provide the guest domain with access to the GPU. The management domain may identify the GPU configuration information when initializing the guest domain and also initialize a new hardware service domain from one of the undifferentiated service domains.

If a service request is not received (block 706:N), then the management domain may continue to wait (block 704). Upon receipt of a service request (block 706:Y), the management domain may identify the service requested (block 708) and write the configuration information associated with the requested service to a shared storage space (block 710). The management domain may then query the reference queue for the next available undifferentiated service domain (block 712). The management domain may select one of the undifferentiated service domains from the pool based on the reference received from the reference queue (block 714) and unpause the boot sequence of the selected undifferentiated service domain (block 716). Having been unpaused, the selected undifferentiated service domain may access the configuration information and complete initialization and configuration as a differentiated service domain (block 718). The management domain may then associate the differentiated service domain with the guest domain (block 720) thereby providing the requested service to the guest domain.

Figure 8:
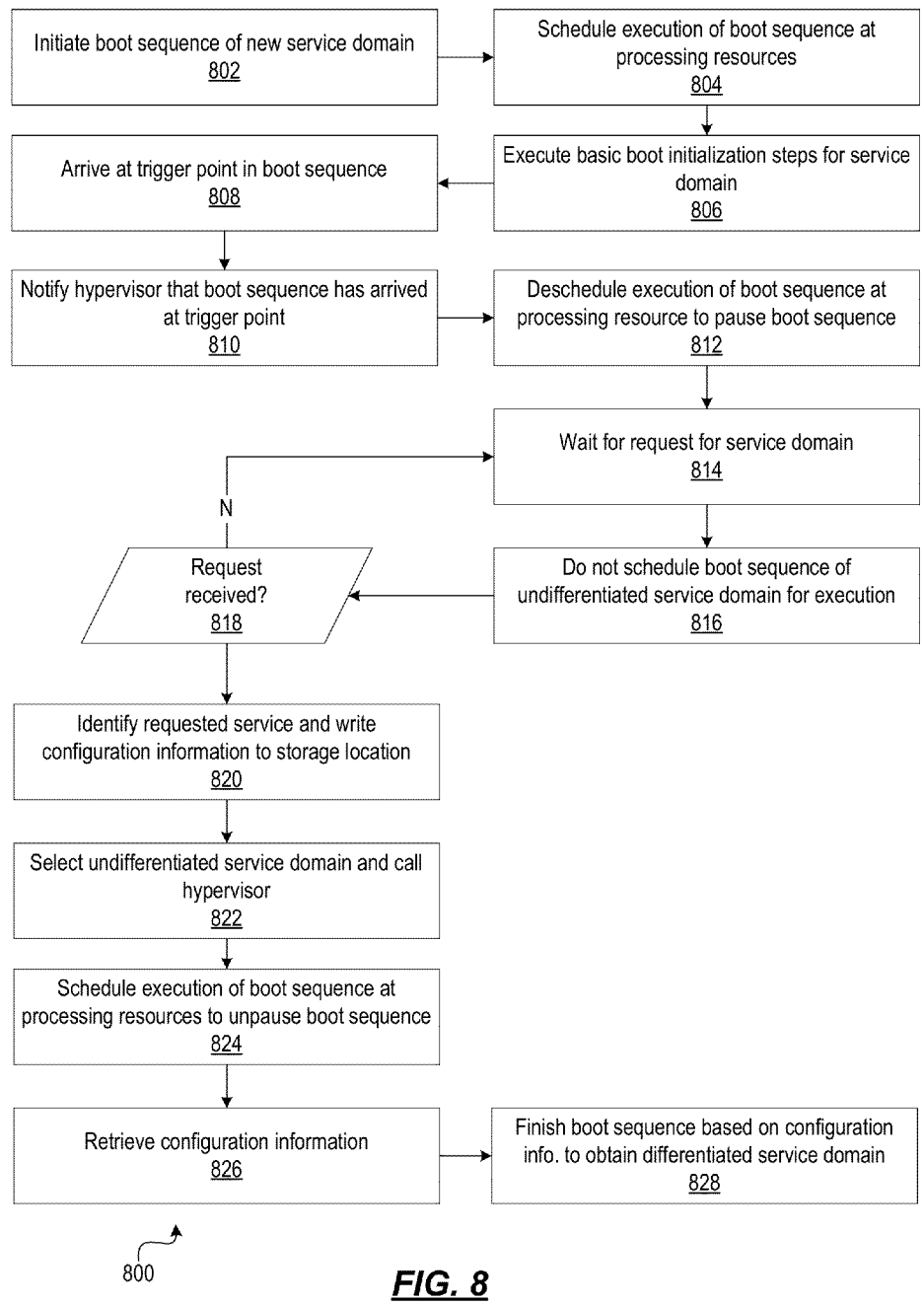
FIG. 8 depicts a flowchart of example method steps for pausing and unpausing an undifferentiated service domain.

FIG. 8 depicts a flowchart 800 of example method steps for pausing and unpausing an undifferentiated service domain. Upon creation of a new service domain, the management domain may initiate the boot sequence of the new service domain (block 802). The hypervisor may schedule execution of the boot sequence at one or more of the processing resources of the virtualization server (804). During the boot sequence for the new service domain, basic hardware discovery and basic service initialization may be performed (block 806) as described above. At this point, the new service domain may be considered to be minimally booted. The boot sequence may be configured such that the next step after the basic boot steps are complete is the step that accesses the shared storage location to retrieve the configuration information. Accordingly, the trigger point may be the point after the basic boot steps are complete but before the step that accesses the configuration information is executed. Upon arrival at the trigger point (block 808), the new service domain may notify the hypervisor that it has arrived at the trigger point (block 810). The new service domain may send the notification to the hypervisor as a hypercall.

When the hypervisor receives the notification from the new service domain that it has reached the trigger point, the hypervisor may deschedule execution of the boot sequence at the processing resources of the virtualization server (block 812). Because the hypervisor does not schedule the boot sequence for execution, the boot sequence of the new service domain is effectively paused. At this point, the new service domain is partially initialized and may thus be described as an undifferentiated service domain. The undifferentiated service domain may thus wait to be selected for further configuration until a guest domain has need of a particular service (block 814). While the undifferentiated service domain is waiting to be selected, the hypervisor does not schedule the paused boot sequence for execution (block 816). If a service request is not received, (block 818:N), the undifferentiated service domain may continue to wait in its paused state (block 814).

When a service request is received (block 818:Y), the management domain may identify the requested service and write the corresponding configuration information to the shared storage location (block 820) as described above. The management domain may then select one of the undifferentiated service domains from the pool and call on the hypervisor to unpause the selected undifferentiated service domain (block 822). The management domain may, for example, issue a hypercall to the hypervisor that identifies the undifferentiated domain to be unpaused. The hypercall may include, for example, the UUID of the selected undifferentiated service domain. In response to receipt of the hypercall from the management domain, the hypervisor may locate the selected undifferentiated service domain and once again schedule the boot sequence for execution (block 824). Once the hypervisor has scheduled the boot sequence for execution, the boot sequence is effectively unpaused and may continue.

As noted above, the hypervisor may pause the boot sequence at the trigger point, e.g., just before the step where the new service domain accesses the configuration information. When the hypervisor unpauses the selected undifferentiated service domain, the next step in the boot sequence may execute, e.g., the step of retrieving the configuration information (block 826). The boot sequence may thus continue in accordance with the configuration information to obtain a differentiated service domain that is configured to provide the requested service (block 828).

As undifferentiated service domains are selected to be configured as differentiated service domains, the number of available undifferentiated service domains may diminish. Accordingly, the management domain may be configured to periodically replenish the pool of undifferentiated service domains. In some example implementations, the management domain may be configured to initiate the creation of new undifferentiated service domains during periods of relatively low processing usage. In this way, spare processing cycles may be efficiently employed to maintain a sufficient number of undifferentiated service domains. In some circumstances, the pool of undifferentiated service domain may be depleted, in which case the management domain may initiate creation of a service domain from scratch to provide the requested service. Moreover, the management domain may tear down unused service domains to reclaim memory as the virtualization server becomes more and more utilized. In some example implementations, the system may employ a centralized load-balancing service to monitor one or more virtualization servers and the number of undifferentiated service domains respectively available at each virtualization server.

The management domain may, for example, be configured to monitor the number of undifferentiated service domains remaining in the pool as well as the processor usage of the virtualization server. If the number of undifferentiated service domains in the pool drops below a predetermined threshold, then the management domain may determine that the pool needs replenishing. If the management domain determines that processor usage is below a predetermine usage threshold (e.g., 50%), then the management domain may initiate creation of one or more new undifferentiated service domains to replenish the pool. It will be appreciated that the minimum number of service domains maintained at the virtualization server as well as the processor usage threshold may depend on the particular design and needs of the virtualization server. Additionally, the minimum number of undifferentiated service domains and the processor usage threshold may be tunable parameters to selectively configure virtualization servers.

Figure 9:
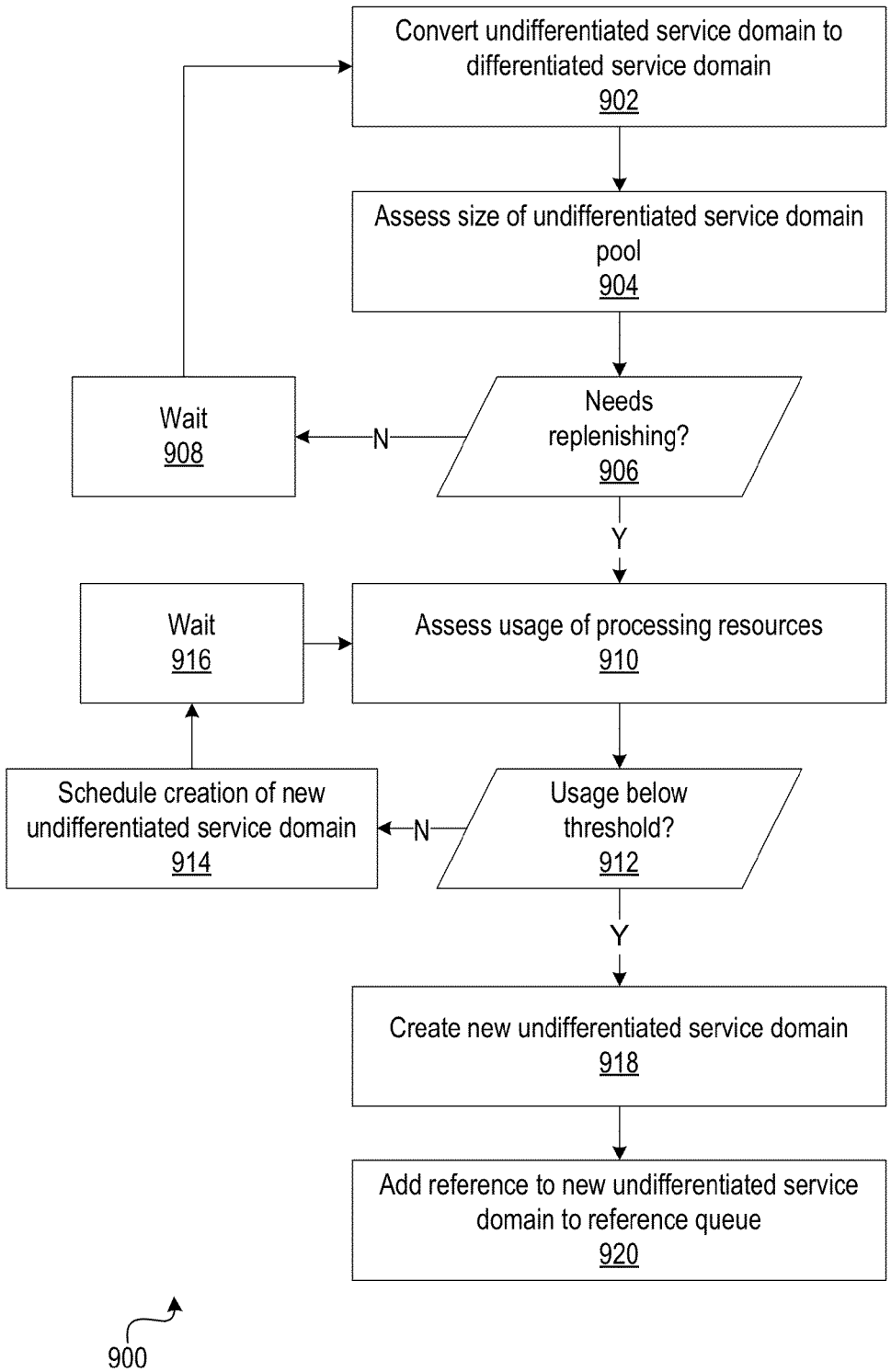
FIG. 9 depicts a flowchart of example methods steps for replenishing a pool of undifferentiated service domains.

FIG. 9 depicts a flowchart 900 of example method steps for replenishing a pool of undifferentiated service domains. In response to receipt of a service request, an undifferentiated service domain may be selected from the pool and converted into a differentiated service domain configured to provide the requested service (block 902). The management domain may periodically assess the size of the undifferentiated service pool (block 904) to determine whether the pool needs replenishing, e.g., based on a minimum threshold. If the management domain determines that the pool does not need replenishing (block 906:N)—e.g., that the number of undifferentiated service domains has not dropped below the minimum threshold—then the management domain may wait (block 908) for more undifferentiated service domains to be converted into differentiated service domains (902).

If the management domain determines that the pool does need replenishing (block 906:Y)—e.g., that the number of undifferentiated service domains has dropped below the minimum threshold—then the management domain may assess the processor usage of the virtualization server (block 910). If the processing usage has not dropped below the usage threshold (block 912:N), then the management domain may schedule creation of one or more new undifferentiated service domains (block 914) and wait until the processor usage drops below the usage threshold (block 916). The management domain may periodically reassess the processor usage at the virtualization server (block 914) and initiate creation of the new undifferentiated service domains (block 918) when the processor usage drops below the usage threshold (912:Y). As noted above, the management domain may add references to the reference queue for the new undifferentiated service domains added to the pool (block 920). By periodically replenishing the pool, the management domain thus ensures a sufficient amount of undifferentiated service domains are available to respond to service requests.

The various approaches described above may be useful to meet the elastic demand for services from guest domains. In some instances, it may be difficult to predict which services the guest domains may have need of. The virtualization server may thus utilize the pool of undifferentiated service domains to meet the possibly unpredictable needs of the guest domains. In other instances, it may be possible to determine which services are the most common services utilized by the guest domains. In these other instances, the virtualization server may maintain one or more pools of differentiated service domains to meet the frequent needs of the guest domains as well as a pool of undifferentiated service domains that may be reconfigured as the less commonly used and less predictable service domains. As an example, the virtualization server may maintain a first pool of differentiated service domains of a first type (e.g., a pool of network service domains), a second pool of differentiated service domains of a second type (e.g., a pool of storage service domains), and a pool of undifferentiated service domains. Additional and alternative implementations will be appreciated with the benefit of this disclosure.

The disclosures set forth above provide a number of technical advantages. Disaggregating the service domains, for example, enables the virtualization server to more efficiently utilize its processing resources through parallelization techniques. Additionally, disaggregating the service domains advantageously avoids the performance degradation that may occur when the services utilized by the guest domains are aggregated into one management domain. As a result, the virtualization server may provide the services to the guest domains with relatively less computing resources. Furthermore, the approaches set forth above reduce the amount of time a guest domain waits for a requested service domain to be initialized. Having undifferentiated service domains partially initialized and readily available increases the speed of starting a requested service. Once a service is requested, the wait time until the requested service is available is reduced to the time it takes to complete initialization and configure the service domain to provide the service. In some instances, the approaches described above may reduce the startup time of a requested service by up to 90%. Moreover, by replenishing the pool of undifferentiated service domains during periods of relatively low processor usage, the virtualization server ensures that spare processing cycles do not go to waste. These technical advantages and more will thus be appreciated with the benefit of this disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method for providing server virtualization comprising:
    generating a partially initialized service domain by pausing a boot sequence during initialization of a new service domain;
    receiving a request for a service;
    writing to a storage location accessible by the partially initialized service domain configuration information corresponding to the service requested;
    unpausing the boot sequence of the partially initialized service domain; and
    completing initialization of the partially initialized service domain using the configuration information to transform the partially initialized service domain into an initialized service domain configured to provide the service requested.

2. The method of claim 1 wherein the partially initialized service domain is one of a plurality of partially initialized service domains, the method further comprising:
    maintaining a queue of references respectively corresponding to the plurality of partially initialized service domains, wherein one of the references in the queue corresponds to the partially initialized service domain;
    selecting the partially initialized service domain from the plurality of partially initialized service domains in response to receipt of the request; and
    removing the reference corresponding to the partially initialized service domain from the queue upon selection.

3. The method of claim 1 wherein the initialized service domain provides the service to one or more guest domains operating at a virtualization server.

4. The method of claim 1 further comprising:
    determining that processor usage has dropped below a predetermined threshold;
    creating a new partially initialized service domain; and
    adding a new reference corresponding to the new partially initialized service domain to a queue of references respectively corresponding to a plurality of partially initialized service domains.

5. The method of claim 4 wherein creating a new partially initialized service domain includes cloning an existing partially initialized service domain to obtain the new partially initialized service domain.

6. The method of claim 1 wherein pausing the boot sequence of the partially initialized service domain includes pausing the boot sequence such that the partially initialized service domain is configurable as one of a plurality of different types of initialized service domains.

7. The method of claim 6 wherein:
    the partially initialized service domain does not utilize a processing resource in a paused state; and
    the partially initialized service domain does utilize the processing resource in an unpaused state.

8. The method of claim 1 wherein the configuration information is an initialization script stored remotely relative to the partially initialized service domain.

9. The method of claim 1 wherein the initialized service domain is one of a software service domain, a hardware service domain, and a combined hardware and software service domain.

10. The method of claim 9 wherein:
    the software service domain is selected from the group consisting of i) a network file system (NFS) service domain, ii) a domain name service (DNS) service domain, and iii) a network switching service domain; and
    the hardware service domain is selected from the group consisting of iv) a processing service domain, v) a network service domain, vi) a storage service domain, and vii) a graphics service domain.

11. The method of claim 10 wherein the hardware service domain manages access to a plurality of hardware devices.

12. An apparatus for providing virtualization services comprising:
    one or more processors; and
    memory storing instructions that, when executed by one of the processors, cause the apparatus to generate a partially initialized service domain by pausing a boot sequence during initialization of a new service domain, receive a request for a service, write to a storage location accessible by the partially initialized service domain configuration information corresponding to the service requested, unpause the boot sequence of the partially initialized service domain, and complete initialization of the partially initialized service domain using the configuration information to transform the partially initialized service domain into an initialized service domain configured to provide the service requested.

13. The apparatus of claim 12 wherein:

the partially initialized service domain is one of a plurality of partially initialized service domains; and the instructions, when executed by one of the processors, further cause the apparatus to maintain a queue of references respectively corresponding to the plurality of partially initialized service domains, wherein one of the references in the queue corresponds to the partially initialized service domain, select the partially initialized service domain from the plurality of partially initialized service domains in response to receipt of the request, and remove the reference corresponding to the partially initialized service domain upon selection.

14. The apparatus of claim 12 wherein:

the instructions, when executed by one of the processors, further cause the apparatus to determine whether processor usage of one or more processors has dropped below a predetermined threshold, and in response to a determination that processor usage has dropped below the predetermined threshold, create a new partially initialized service domain and add a new reference corresponding to the new partially initialized service domain to a queue of references respectively corresponding to a plurality of partially initialized service domains.

15. The apparatus of claim 12 wherein pausing the boot sequence of the partially initialized service domain comprises pausing the boot sequence such that the partially initialized service domain is configurable as one of a plurality of different types of initialized service domains.

16. The apparatus of claim 15 wherein pausing the boot sequence comprises withholding scheduling of execution of the boot sequence and unpausing the boot sequence includes scheduling execution of the boot sequence.

17. The apparatus of claim 16 wherein:

the instructions, when executed by one of the processors, further cause the apparatus to receive, from the partially initialized service domain, a notification indicating that the boot sequence has reached a trigger point; and pausing the boot sequence comprises pausing the boot sequence in response to receipt of the notification.

18. The apparatus of claim 12 wherein:

the configuration information is a set of key-value pairings;

the key-value pairings indicate a service domain type of the initialized service domain, a number of hardware devices to associate with the initialized service domain, and a number of guest domains to associate with the initialized service domain.

* * * * *